Oct. 1, 1940.	T. S. PARK	2,216,353
PISTON
Filed May 28, 1937	2 Sheets-Sheet 1
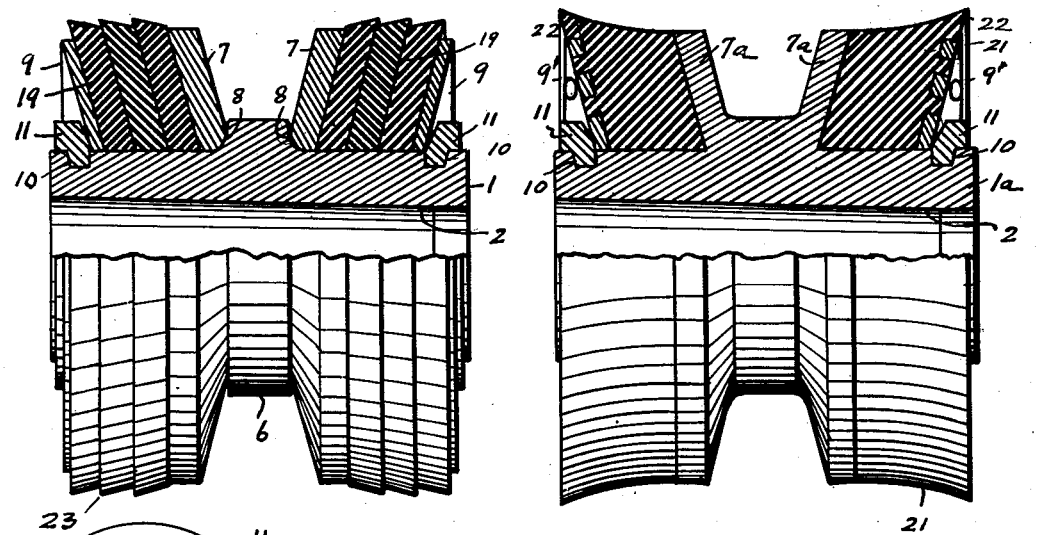
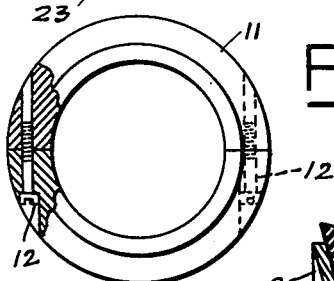
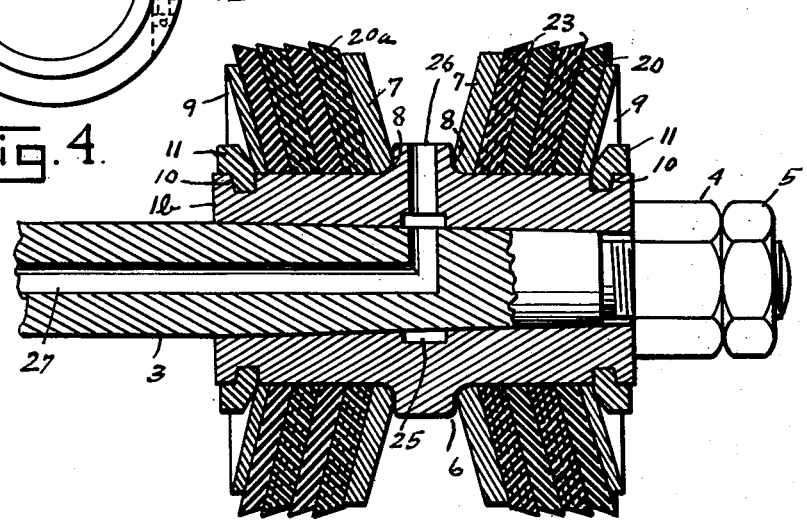
Inventor
Tracy S. Park
By
Edward V. Hardway
Attorney Oct. 1, 1940.                    T. S. PARK                    2,216,353
                                  PISTON
                          Filed May 28, 1937                2 Sheets-Sheet 2

Inventor
Tracy S. Park

By
Edward V. Hardway
    Attorney

Patented Oct. 1, 1940

2,216,353

UNITED STATES PATENT OFFICE 2,216,353

PISTON

Tracy S. Park, Houston, Tex., assignor, by direct and mesne assignments, of one-half to Frank Kinzbach and one-half to Robert B. Kinzbach, both of Harris County, Tex.

Application May 28, 1937, Serial No. 145,214

10 Claims. (Cl. 309—7)

This invention relates to a piston and has particular relation to that type of piston particularly designed for use in pumps.

The piston herein described has been specially constructed for withstanding the wear incident to the handling of gritty fluids and is consequently very efficient for use in slush pumps whereby drilling fluid is forced, under high pressure, into wells during drilling operations.

An object of the invention is to provide a piston comprising a body to be attached to the piston rod and a novel packing assembly on the body shaped to form a close fit with the pump liner to prevent leakage of the fluid past the piston and the consequent wearing or cutting away of the packing by the grit as will be more specifically hereinafter explained.

It is another object of the invention to provide a piston of the character described wherein the packing is so mounted that it is permitted to yield upon the power stroke to form said close fit with the pump liner and to relax upon back stroke or suction stroke to minimize the wear on the packing.

The invention also comprehends a novel type of piston packing so mounted on the body that it may be readily removed for replacements in case of wear or mutilation.

It is another object of the invention to provide a piston which may be cheaply produced and whose parts may be readily and quickly assembled and securely maintained in assembled relation.

The invention also embodies a construction whereby a lubricant may be readily applied to the pump liner and piston in case of necessity therefor.

With the above and other objects in view the invention has particular relation to certain novel features of construction, operation and arrangement of parts, an example of which is given in this specification and illustrated in the accompanying drawings, wherein—

Figure 1 shows a side view of the piston, partly in section.

Figure 2 shows a side view, partly in section of another embodiment.

Figure 3 shows a longitudinal, sectional view of another embodiment.

Figure 4 shows an elevational view, partly in section of a locking ring employed.

Figure 5 shows a fragmentary, longitudinal, sectional view of the piston shown in operation in a pump liner.

Referring now more particularly to the drawings wherein like numerals of references designate the same parts in each of the figures, the numeral 1 designates the piston body, as shown in Figure 1, which is of a general tubular form having a tapering, axial bearing 2 therethrough to receive the correspondingly shaped end of a piston rod as 3, the piston being secured on said rod by means of the nut 4 and the lock nut 5.

Other embodiments of the body, as 1a, 1b and 1c are shown in Figures 2, 3, 6 and 8, respectively.

Figure 6:
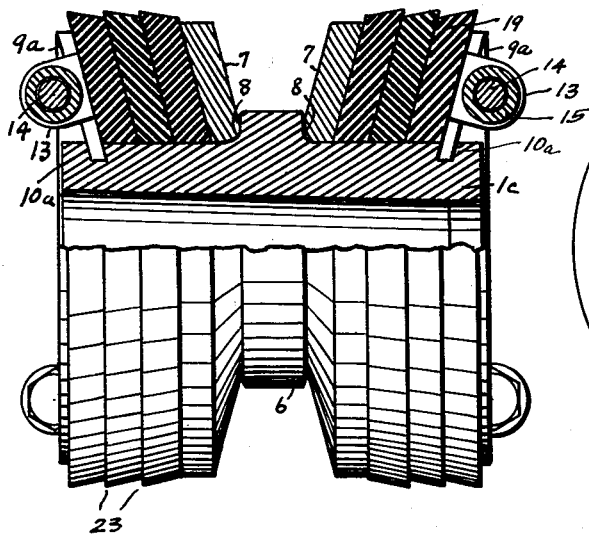
Figure 6 shows a side view, partly in section of the form illustrated in Figure 1 showing another embodiment of the locking ring.

The body shown in Figures 1, 3 and 6 has the external, annular, centrally located rib 6 thereon on opposite sides of which are the back plates 7, 7 which diverge outwardly and which are preferably formed of spring steel so as to have the required flexibility. The inner margins of the plates 7 are rounded off to fit the concaved, annular bearings 8 on opposite sides of the rib 6. As shown in Figure 2 the back plates 7a are integral with the body 1a.

Adjacent the ends of the body, as shown in Figures 1 and 3 are the front end plates 9, 9 which are approximately similar in shape to the back plates 7. Adjacent the ends of the body as shown in Figure 2 there are the front plates 9' which are approximately similar in shape to the back plates 7a. The packing, hereinafter more specifically described, surrounds the body and is clamped between said back plates and front end plates. In the form shown in Figures 1, 2 and 3 the body has the surrounding end grooves 10, 10 and split locking rings 11 are fitted into said grooves to secure the packing assemblies on the body.

As shown in Figure 4 this locking ring is formed of two sections which may be secured together, when fitted in the grooves, by the clamp screws 12, 12. It will be noted that the inner sides of the rings 11 are tapered to fit against the corresponding end plates 9 with a wedging effect.

Figure 7:
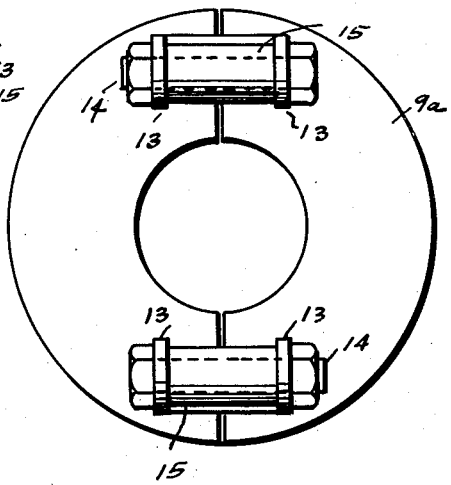
Figure 7 shows an end view thereof.

In the forms shown in Figures 1, 2 and 3 upon application of endwise pressure against an end plate said end plate is free to move inwardly against the packing and towards the center of the body. In the form shown in Figures 6 and 7, the outer end plates 9a, 9a have their inner margins seated in the external, annular grooves 10a, 10a adjacent the ends of the body. These end plates 9a are preferably formed of two sections, as shown in Figure 7, each section having the outturned lugs 13, 13 provided with bearings to receive the clamp bolts 14 which are fitted therethrough and are provided with heads on one end and nuts on the other end between said lugs around said clamp bolts are the spacer sleeves 15, 15. The outer end plates 9a of this form may be seated in the grooves 10a and secured therein by the bolts 14 in an obvious manner. In this form the end plates 9a are held against bodily movement towards the center of the body when subjected to pressure stroke. In the form shown in Figures 8 and 9 the split locking ring 11a is employed.

Figure 8:
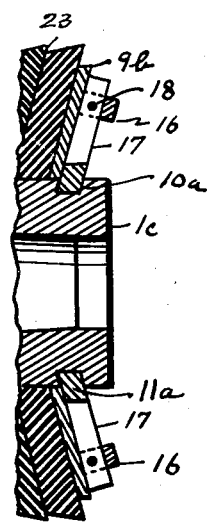
Figure 8 shows a fragmentary, longitudinal, sectional view of the piston showing still another embodiment of the locking ring.
Figure 9:
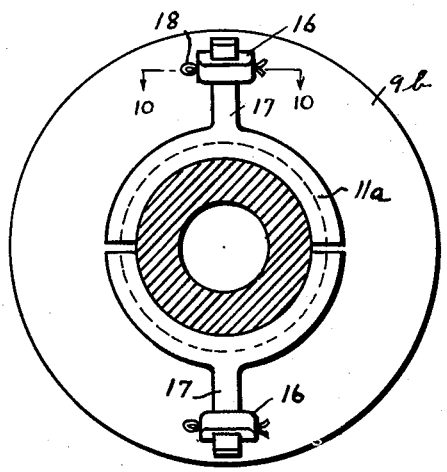
Figure 9 shows an end view thereof.
Figure 10:
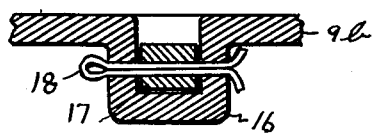
Figure 10 shows an enlarged, fragmentary, sectional view taken on the line 10—10 of Figure 9.

The sections of this ring 11a may be seated in the groove 10a, as shown in Figures 8 and 9 to lock the outer, or front, end plates 9b in position. The plates 9b have the outstanding lugs 16 thereon provided with bearings to receive the outer ends of the outwardly extended arms 17, which extend outwardly from the sections of the split ring 11a, as shown in Figures 8 and 9 and said arms may be secured in place in any preferred manner as by a cotter key 18. In this form the outer end plate 9b is free to move, toward the center of the body in response to the pressure, upon pressure stroke of the piston.

As shown in Figures 1, 5, 6 and 8 there are the assemblies of packing discs as 19 on each end of the body between the back and front plates, respectively. In these forms said discs are formed preferably of rubber as shown.

A similar assembly of packing discs 20 is shown in Figure 3 excepting that alternate packing discs in this latter figure are preferably formed of fabric, or rubberized fabric as shown.

In the form shown in Figure 2 the packing 21 is shown in the form of single relatively thick discs between the front and back plates, one being located at each end of the piston. The end plates 9' of this form are countersunk into the packing and this packing is moulded through openings in said plates as shown. In this form the outer margins of the packing are tapered outwardly toward the ends of the piston terminating in the annular forwardly directed lips 22 which fit closely against the liner walls to prevent leakage of the gritty fluid past the piston.

In the form shown in Figures 1, 3, 5, 6 and 8, the outer margins of the packing discs are tapered outwardly toward the ends of the piston terminating in the series of oppositely directed, annular lips 23 as shown. This forms a very efficient type of piston for the reason that as the forward lip becomes mutilated or worn so as to become ineffective the next succeeding lip will perform the required function of preventing leakage and so on until all of the lips are worn away.

As stated, in Figure 3 alternate packing discs as 20a are formed of fabric or rubberized fabric. This form of piston is very efficient for the reason that the discs will become saturated with the liquid and will effectively wipe off the liner walls to remove the grit and will also keep said walls lubricated. As is shown in Figure 5 the piston is located in working position in the pump liner 24. The piston is inserted into the liner under compression so that the outer surfaces of the discs of the piston are forced into alignment and work in close contact with the liner walls. This is also true of the type of piston shown in Figure 2 when inserted into the liner.

In inserting the type of piston shown in Figures 1, 2, 5 and 6 into the liner, if it be desired the space between the back plates may be filled with hard oil or a suitable lubricating grease whereby to lubricate the walls of the liner to minimize the friction of the piston therewith. As illustrated in Figure 3, the body 1b has an inside, annular groove 25 and leading out from said groove through the body into the space between the back plates 7 there is a duct 26. In this form the rod 3 has an axial channel 27 which terminates in the groove 25 and through which a lubricant may be forced, from time to time, by any conventional appliance for the purpose, into the space between said back plates whereby a lubricant may be supplied, to keep said space filled, as required.

The drawings and description disclose what are now considered to be a preferred form of the invention by way of illustration only, while the broad principle of the invention will be defined by the appended claims.

What I claim is:

1. A piston comprising a body having an external, annular abutment intermediate its end, diverging flexible frusto conical back plates spaced apart by said abutment, diverging frusto conical front plates on the body parallel to said back plates, packings on the body between the respective back and front plates, the plate and packing assemblies being formed and mounted to yield in response to endwise pressure exerted against the end plates.

2. A piston comprising a body, flexible frusto conical back plates and front plates on the body, said back plates diverging outwardly relative to each other to form an annular lubricating space around the piston, packing on the body between the respective front and back plates and shaped to fit closely in a cylinder and said front plates being substantially parallel to said respective back plates.

3. A piston comprising a body having an annular abutment intermediate the ends thereof, and having an annular groove with inwardly converging sides at each end, a packing assembly on the body on each side of the abutment, each assembly including a plurality of annular packing rings around the body, the rings being of approximately the same diameters which is appreciably greater than the diameter of the abutment and having forwardly directed beveled outside edges and flexible outer and inner end plates confining each assembly and movably mounted upon the body and the front and back plates of each set being parallel and having their faces defining a conical frustrum, the inner end plates abutting the abutment, removable end clamps adapted to fit in the grooves against the outer end plates, the longitudinal distance between the grooves being less than the normal thickness of the abutment, packing and plates combined, the abutment between said inner end plates providing a lubricant reservoir whereby said piston is lubricated.

4. A piston comprising a body, substantially parallel back and front plates on the body shaped to diverge forwardly with respect to the axis of the piston, packing clamped between said plates around the body, said packing being shaped and beveled to fit closely in a cylinder and said back plate being flexible and the front plate being mounted to yield longitudinally and to flex adjacent its periphery in response to endwise pressure exerted against the front plate.

5. A piston comprising a body, a flexible back plate on the body, packing around the body in front of the back plate, a flexible front plate against the forward side of the packing and substantially parallel to said back plate, said front plate being slidable on the body and adapted to bend adjacent its periphery to exert a compressive force against the packing in response to endwise pressure to which the piston is subjected on the forward stroke of the piston in a pump cylinder, and beveled means wedgingly engaging the front plate for initially placing the plate and packing under compression and for maintaining the plate and packing assembly in assembled relation on the body.

6. A piston comprising a body, a flexible frusto conical back plate on the body, a flexible frusto conical front plate on the body substantially parallel to said back plate, an assembly of discs formed of packing material clamped on the body between said plates, the outer margins of the discs being beveled to present forwardly directed annular lips which extend out radially an appreciable distance beyond the plates.

7. A piston comprising a body, substantially parallel, flexible, frusto conical back and front plates on the body, an assembly of packing discs clamped on the body between said plates, the outer margins of the discs being beveled to present forwardly directed annular lips, the body having an external, annular end groove and a removable locking ring in the groove, a portion of said ring being beveled for wedging the same against the front plate for maintaining the plate and packing assembly on the body.

8. A slush pump piston comprising a body having an annular abutment intermediate the ends thereof, and having an annular groove with inwardly converging sides at each end, a packing assembly on the body on each side of the abutment, each assembly including a plurality of annular packing rings around the body, the rings being of approximately the same diameters which is appreciably greater than the diameter of the abutment and having forwardly directed beveled outside edges and flexible outer and inner end plates confining each assembly and movably mounted upon the body and having each opposite face defining a conical frustrum, said flexible inner plate being substantially equal in diameter to the diameter of the seal rings and the outer plates being of smaller diameter than the diameter of the seal rings whereby the plates will laterally support the seal rings and also allow fluid pressure to act on the seal rings at each end of the piston, the inner end plates abutting the abutment, removable end clamps adapted to fit in the grooves against the outer end plates, the longitudinal distance between the grooves being less than the normal thickness of the abutment, packing and plates combined.

9. A piston comprising a body, substantially parallel back and front plates on the body shaped to diverge forwardly with respect to the axis of the piston, packing clamped between said plates around the body, said packing being shaped and beveled to fit closely in a cylinder and said back plate being flexible and the front plate being mounted to yield longitudinally in response to endwise pressure exerted against the front plate the body having an external, annular end groove and a removable locking ring in the groove, a portion of said ring being beveled for wedging the same against the front plate for maintaining the plate and packing assembly on the body.

10. A piston comprising a body, a flexible, frusto, conical back plate on the body, a flexible, frusto conical front plate on the body substantially parallel to the back plate, an assembly of discs formed of packing material clamped on the body between said plates, the outer margins of the discs being beveled to present forwardly directed, annular lips which project out radially beyond the plates.

TRACY S. PARK.